| (12) | United States Patent | (10) Patent No.: | US 7,133,159 B2 |
|---|---|---|---|
| | Yang et al. | (45) Date of Patent: | Nov. 7, 2006 |

(54) ONLINE BI-DIRECTIONAL COLOR CALIBRATION

(75) Inventors: Dongli Yang, Vancouver, WA (US); Yifeng Wu, Vancouver, WA (US); Philip B. Cowan, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 10/408,199

(22) Filed: Apr. 5, 2003

(65) Prior Publication Data

US 2004/0196476 A1    Oct. 7, 2004

(51) Int. Cl.
*H04N 1/40* (2006.01)

(52) U.S. Cl. .................. 358/1.9; 358/3.26; 358/504

(58) Field of Classification Search ................ 358/1.9, 358/2.1, 3.26, 502, 406, 518, 5.2, 504; 347/7, 347/12, 43
See application file for complete search history.

(56) References Cited

U.S. PATENT DOCUMENTS 5,936,741 A    8/1999  Burns
6,213,584 B1 *  4/2001  Noyes et al. ............... 347/40
6,354,692 B1 *  3/2002  Ross ............................ 347/41
6,705,695 B1 *  3/2004  Otsuki ........................ 347/9
6,863,367 B1 *  3/2005  Hamamoto et al. ........ 347/23
6,980,328 B1 * 12/2005  Hudson ..................... 358/1.9
2003/0007165 A1 *  1/2003  Hudson ..................... 358/1.9
2003/0048327 A1 *  3/2003  Serra et al. ................ 347/43

FOREIGN PATENT DOCUMENTS

| EP | 0737001 | 10/1996 |
|---|---|---|
| EP | 1048475 | 11/2000 |
| EP | 1072421 | 1/2001 |
| EP | 1291192 | 3/2003 |
| EP | 1273453 | 5/2005 |

OTHER PUBLICATIONS

U.S. Appl. No. 09/899,466, filed Jul. 5, 2001, Hudson.
European Search Report dated Mar. 31, 2006.

* cited by examiner

*Primary Examiner*—Thomas D. Lee
*Assistant Examiner*—Stephen Brinich

(57) ABSTRACT

A method of an embodiment of he invention is disclosed in which image data is bi-directionally color calibrated using one or more online color calibration tables. The image data, as has been bi-directionally color calibrated is output.

12 Claims, 9 Drawing Sheets

ONLINE BI-DIRECTIONAL COLOR CALIBRATION

BACKGROUND

To increase the performance of inkjet printers, one pass bi-directional printing may be employed. This means that ink is ejected in both directions when the inkjet printheads are moving rom left to right across a swath of media, and also when they are moving from right to left across a swath of media. Bi-directional printing is distinguished from single-direction printing, in which ink is ejected when the inkjet printheads are moving from either left to right or from right to left across a media swath, and not in both directions. Using bi-directional printing can typically increase the performance of inkjet printers by roughly a factor or two.

For color printers, a color space conversion is usually performed on an image prior to its being printed. A color space is a mathematical model that is used to represent the colors of an image. By combining the corresponding constituent colors of a color space in different ways, any desired color can be represented. The typical color space for display purposes is red-green-blue (RGB), whereas a type of color space used for printing purposes is cyan-magenta-yellow (CMY), or cyan-magenta-yellow-black (CMYK). Depending on the color space being used, combining the constituent colors of the model produces different visual results.

Color space conversion, such as from an RGB color space to a CMY, CMYK, or other color space, typically employs a three-dimensional table, called a color map. For each unique combination of red, green, and blue values, the map provides corresponding values for cyan, magenta, yellow, and black. Once all the pixels of an image are converted from RGB to a given printer's resident color model, printing may occur.

To avoid visual artifacts, such as hue shift, when using bi-directional color inkjet printers, color space conversion can be performed for each direction in which the inkjet printheads travel over the media. For instance, there may be a first color map that translates , G, B values in the RGB color space to C, M, Y, K values in the CMYK color space that is used when the inkjet printheads travel from left to right over media swaths. There may also be a second color map that translates the same R, G, B values in the RGB color space to C, M, Y, K values in the CMYK color space that is used when the printheads travel from right to left over the media swaths.

Usually, such bi-directional color maps are constructed offline, under nominal conditions for a given color inkjet printer. These nominal conditions include a nominal printhead being used with ideal ink drop weights, ideal inks, particular types of target media, as well as standard operating temperature, humidity and other environmental factors. In real-world applications, however, the conditions in which the printer is used may depart from the nominal conditions in which the bi-directional color maps were developed. This can affect the accuracy of the bi-directional color maps, affect printer output quality, and affect bi-directional printing robustness. For instance, some banding artifacts may become visible, mainly due to the color hue shift between the swaths printed by the printheads traveling from left to right and the swaths printed by the printheads traveling from right to left.

SUMMARY

A method of an embodiment of the invention bi-directionally color calibrates image data using one or more online color calibration tables. The image data, as has been bi-directionally color calibrated, is output.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the embodiments. Other embodiments may be utilized and logical, mechanical, and other changes may be made without departing from the spirit or scope of the present invention. The following detailed description is, therefore, not to be taken in a limiting sense, and the scope of the present invention is defined only by the appended claims.

Overview of Online Bi-Directional Color Calibration

Figure 1A:
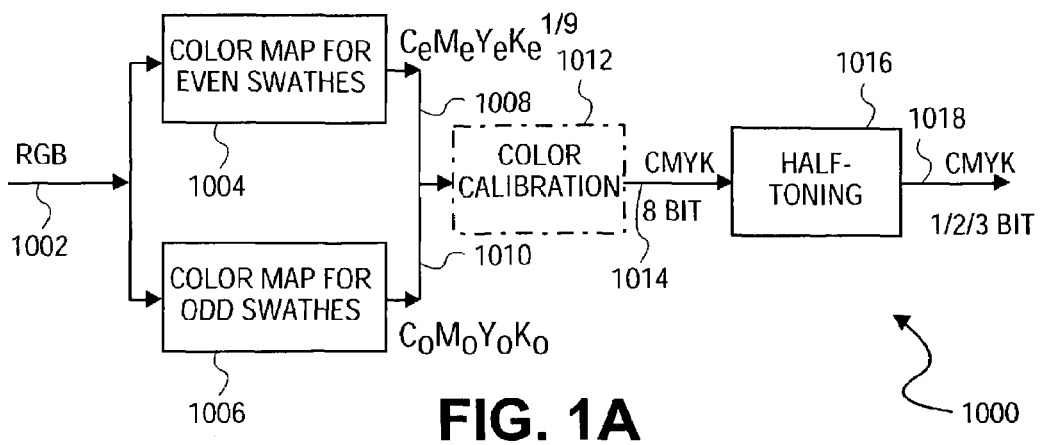
FIGS. 1A, 1B, and 1C are diagrams used for describing an overview of online bi-directional color calibration, according to an embodiment of the invention.
Figure 1B:
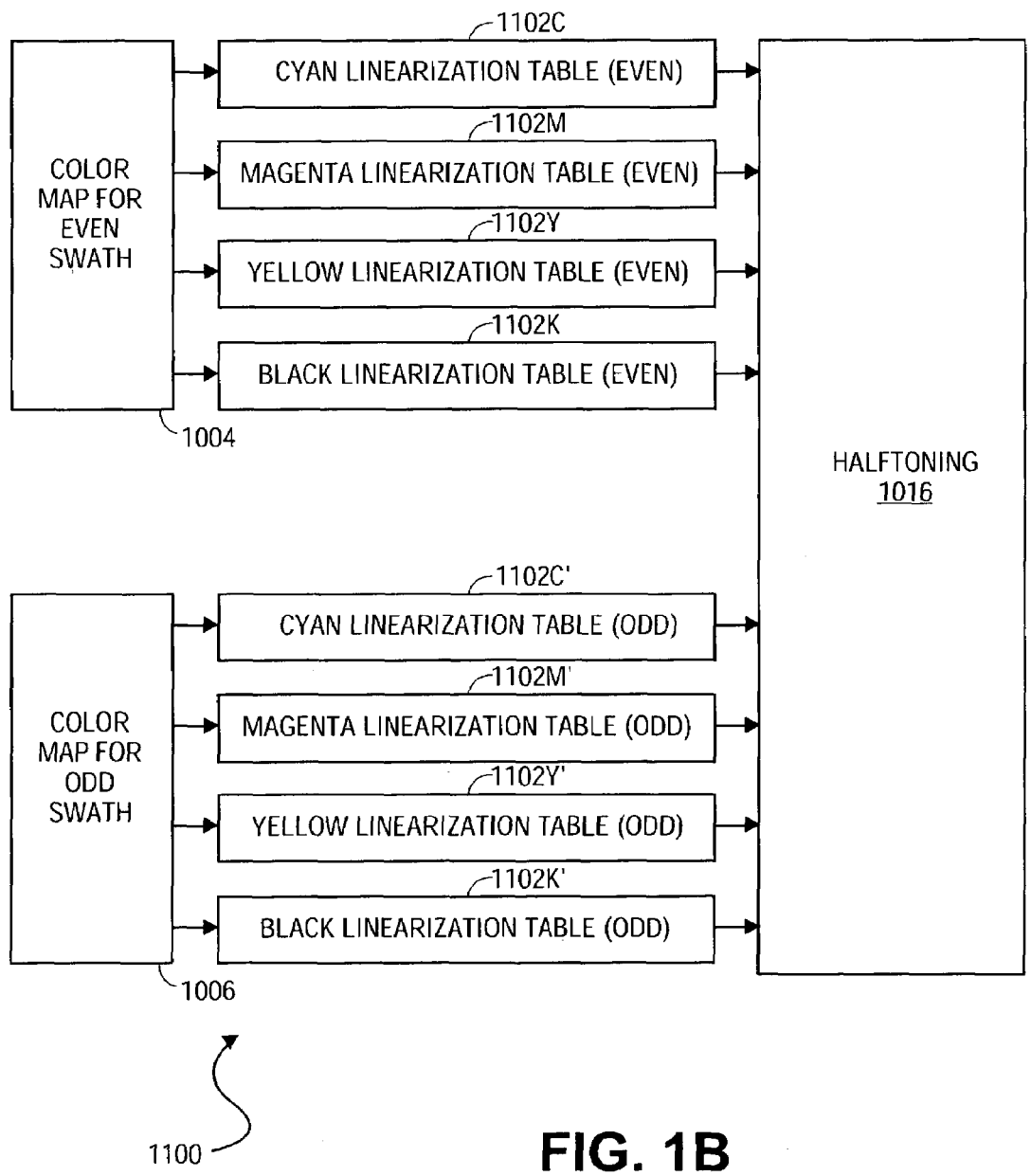
Figure 1C:
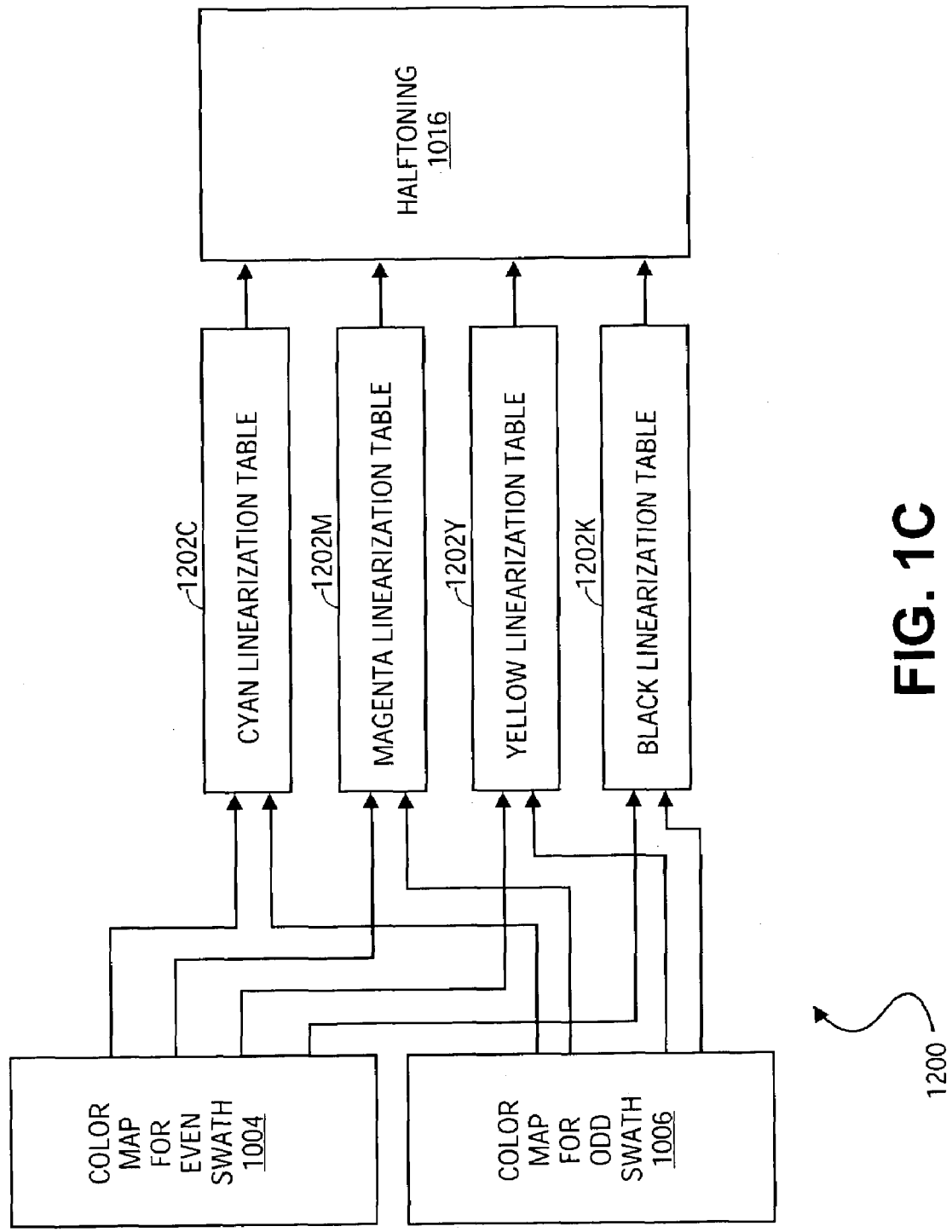

An overview of how online bi-directional color calibration is performed in accordance with an embodiment of the invention is first provided, in conjunction with FIGS. 1A, 1B, and 1C. Further details regarding online bi-directional color calibration are provided in subsequent sections of the detailed description. In FIG. 1A, the diagram 1000 indicates an overall work flow in which bi-directional color calibration is accomplished, according to an embodiment of the invention. Data in accordance with a red-green-blue (RGB) color space is input, as indicated by the arrow 1002. The data is mapped to a cyan-magenta-yellow-black (CMYK) color space in accordance with two directions, using a first color map 1004 for media swathes to be printed in one direction, such as for the even swathes, and a second color map 1006 for media swathes to be printed in another direction, such as for the odd swathes. This results in the RGB color space data being converted to CMYK color space data in two ways: $C_eM_eY_eK_e$ color space data resulting from the conversion using the first color map 1004, and $C_oM_oY_oK_o$ color space data resulting from conversion using the second color map 1006, as indicated by the arrows 1008 and 1010, respectively.

Both the $C_eM_eY_eK_e$ data and the $C_oM_oY_oK_o$ data are then bi-directionally color calibrated in an online manner, as indicated by the block 1012 in the diagram 1000 of FIG. 1A. This results in color-calibrated CMYK data, as indicated by the arrow 1014, which is inclusive of color-calibrated $C_eM_eY_eK_e$ data and color-calibrated $C_oM_oY_oK_o$ data. The color-calibrated CMYK data may have the same color as the RGB data that was input. For instance, the data may have individual values from 0–255, indicating an eight-bit depth. To convert this data to a lower bit depth, half-toning is performed as indicated by the block 1016. This results in the color-calibrated CMYK data having a lower bit depth, such as one, two, or three bits, as indicated by the arrow 1018.

In FIG. 1B, the diagram 1100 shows how the online bi-directional color calibration of FIG. 1A can be specifically accomplished using two sets of linearization tables, according to an embodiment of the invention. The $C_eM_eY_eK_e$ data resulting from use of the color map 1004 is input into the set of linearization tables 1102 for one direction, such as for the even media swaths. The set of linearization tables 1102 includes a linearization table for each color of the CMYK color space: a cyan linearization table 1102C, a magenta linearization table 1102M, a yellow linearization table 1102Y, and a black linearization table 1102K. Likewise, the $C_oM_oY_oK_o$ data resulting from the use of the color map 1106 is input into the set of linearization tables 1102' for the other direction, such as for the odd media swaths. The set of linearization tables 1102' also includes a linearization table for each color of the CMYK color space: a cyan linearization table 1102C', a magenta linearization table 1102M', a yellow linearization table 1102Y', and a black linearization table 1102K'. Both the $C_eM_eY_eK_3$ data and the $C_oM_oY_oK_9$ data as color-calibrated are then half-toned, as indicated by the block 1016.

In FIG. 1C, the diagram 1200 shows how the online bi-directional color calibration of FIG. 1A can be specifically accomplished using one set of linearization tables, according to an embodiment of the invention. Both the $C_eM_eY_eK_e$ data and the $C_oM_oY_oK_o$ data, resulting from the use of the color maps 1004 and 1006, respectively, are input into the same set of linearization tables 1202, regardless of their direction. The set of linearization tables 1202 includes a linearization table for each color of the CMYK color space: a cyan linearization table 1202C, a magenta linearization table 1202M, a yellow linearization table 1202Y, and a black linearization table 1202K. Both the $C_eM_eY_eK_e$ data and the $C_oM_oY_oK_o$ data as color-calibrated are again subsequently half-toned, as indicated by the block 1016.

Linearization Background Overview

Figure 2A:
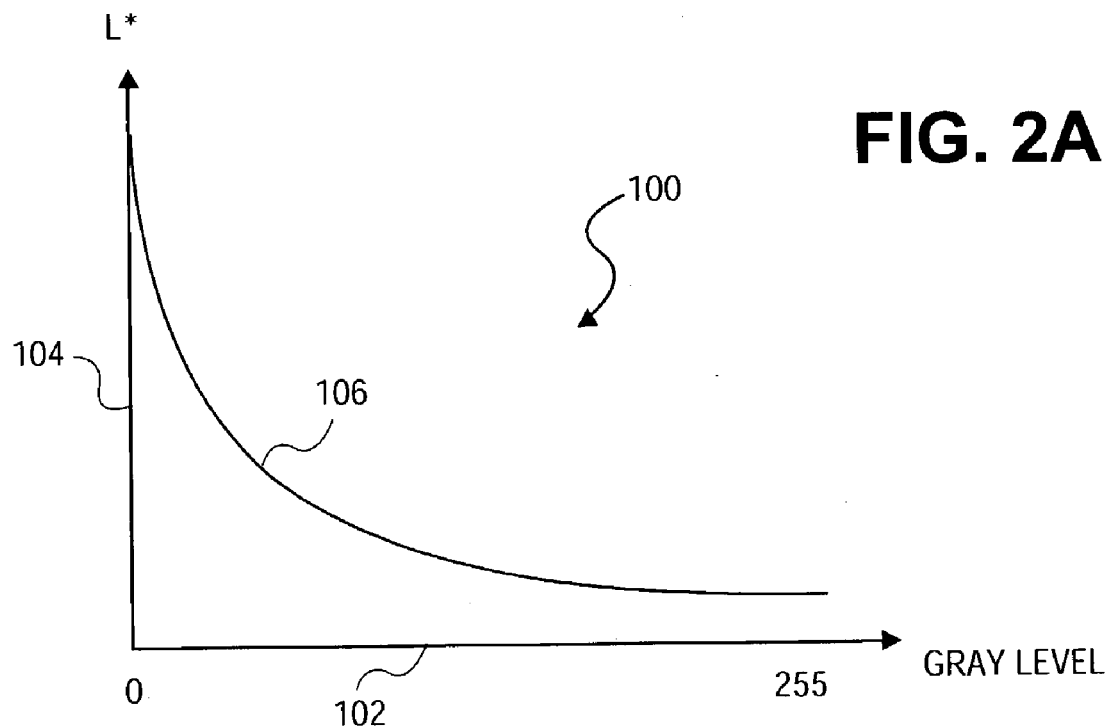
FIGS. 2A, 2B, 2C, and 2D are graphs used for describing a background overview of the bi-directional color calibration process, according to an embodiment of the invention.

A background overview of linearization is now provided, prior to further description of online bi-directional color calibration. The background overview of linearization is described in conjunction with FIGS. 2A, 2B, 2C, and 2D. FIG. 2A shows a graph 100 on which a measured quantity, such as print density, or L*, is plotted on the y-axis 104 as a function of tone, or gray, level on the x-axis 102, according to an embodiment of the invention. The measurement curve depicted in FIG. 2A can be obtained by measuring a printed color calibration target, as is described later in the detailed description in conjunction with FIG. 4B. The curve 106 depicts the relationship between tone levels and L* measurements for a single colorant. The colorant may be ink, such as that output by a image-forming device, like an inkjet printer device. The colorant may be a given color component of a color space. For instance, the color space may be the cyan-magenta-yellow-black (CMYK) color space, having the color components cyan, magenta, yellow, and black. As the tone level increases from 0 to 255, the L* value decreases. The graph 100 reflects the lightness, as represented by L*, decreasing as the tone level increases along a gradient.

Figure 2B:
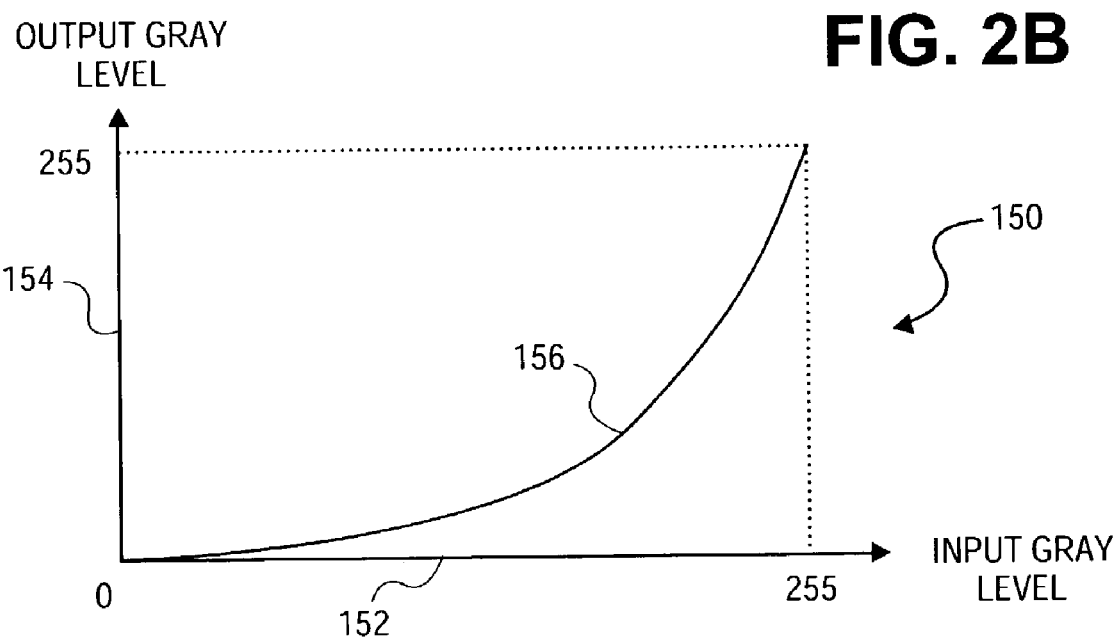

FIG. 2B shows a graph 250 on which output tone, or gray level, is plotted on the y-axis 154 as a function of input tone, or gray, level on the x-axis 152, according to an embodiment of the invention. The curve 156 represents a color calibration, or linearization, table, after one-dimensional (1D) color calibration, or linearization, has been performed for a single colorant. For a given input tone level, the curve 156 indicates the actual output tone level to be employed. That is, for any given input tone value, the output tone value, which is determined by utilizing the look-up table represented by the curve 156, is used to achieve the desired measurement data in FIG. 2A. A more detailed description regarding the 1D color calibration process is now presented in conjunction with FIGS. 2C and 2D.

Figure 2C:
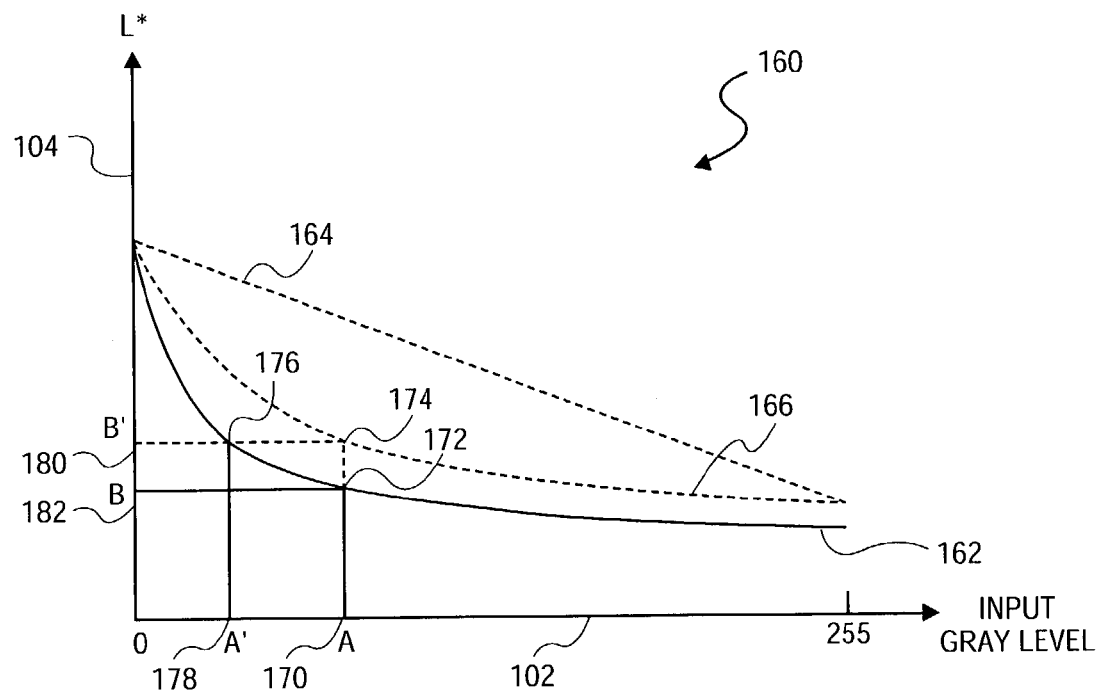

FIG. 2C shows a graph 160 on which L* is plotted on the y-axis 104 as a function of tone, or gray, level on the x-axis 102 for a reference curve 164 or 166, and a measurement curve 162 of a printhead to be calibrated, according to an embodiment of the invention. The curve 166 depicts a reference, or target, curve. The reference curve can be a measurement curve for a nominal printhead with ideal drop weight and nominal printing conditions. It can also be a straight line, as in the curve 164. The reference curve can more generally be any predefined curve. By comparison, the curve 162 depicts the measurement for a printhead with unknown drop weight, or a printhead that needs to be calibrated.

The color calibration process for the printhead is described as follows. For a given input tone level 170, the measured L* value is the L* value 182, which is determined by the measurement curve 162 through the intersection point 172. The desired, or targeted, L* value for the input tone level 170 is the L* value 180, which is determined by the reference curve 166 through the intersection point 174, where the curve 166 is chosen over the curve 164 for sake of description. From the intersection point 176 of the measurement curve 162 and the desired L* value 180 of reference curve 166, the output tone level 178 can be identified. This means that for the measurement data, the output tone level 178 will yield the desired L* value 180. Therefore, in order to obtain the desired measurement L* value 180 for the input tone level 170, an intermediate step or act of mapping of the tone level 170 to the tone level 178 is performed. This implies that for every point in the input tone level there is a unique mapping tone as output. Such a tone range mapping process is the application of 1D color calibration.

Figure 2D:
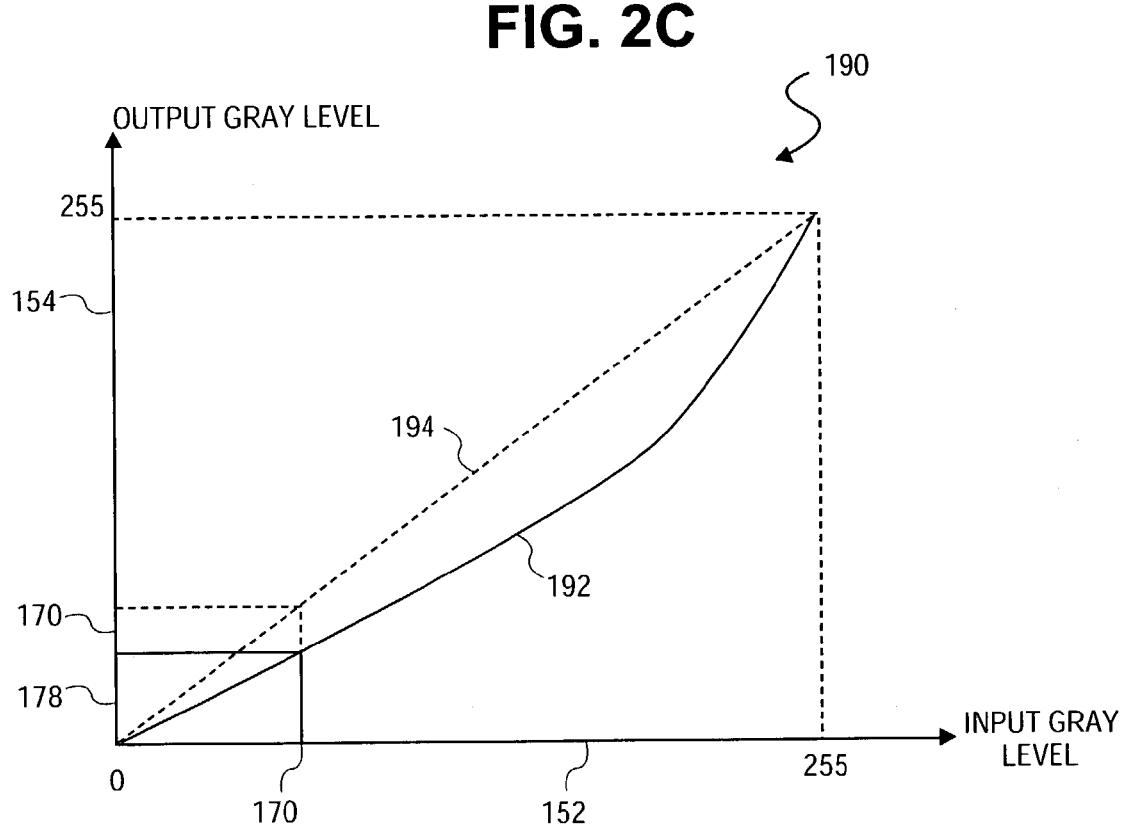

FIG. 2D shows a graph 190 on which the output gray level is plotted on the y-axis 154 as a function of input gray level on the x-axis 152 for color calibration, according to an embodiment of the invention. The curve 194 represents the mapping table for the reference curve of the graph 160 in FIG. 2C. The curve 192 represents the color calibration table for the measurement curve 162 of the printhead to be calibrated after 1D color calibration has been performed. From the graph 190, the input tone level 170 mapped to the output tone level 178, which is lower than the input tone level 170. This lower output means that the printhead to be calibrated is a heavier pen having a bigger drop weight than that of the nominal printhead. If the printhead were used without color calibration, more colorant than the desired amount would be used, resulting in degraded print quality.

Furthermore, when bi-directional printing is employed, such that the inkjet printhead, or other inkjet printing mechanism, ejects ink, or other colorant, in both directions over a media swath, the actual value of the color component may further vary, depending on which direction the printhead was traveling when ejecting the ink. This reduces the accuracy and the robustness of the bi-directional color maps. When the printhead is calibrated, a linearization table, or look-up table (LUT), is generated, which is depicted in FIG. 2D as the curve 192 of the graph 190. The linearization table indicates how much correction should be made to the non-nominal condition of the printhead, by mapping the input tone level to the appropriate output tone level. Every colorant used in the image-forming device preferably has its own unique linearization table after the color calibration. With these linearization tables, the image-forming device may adjust the amount of colorant for the color component in question, such that the desired or correct amount of color is actually ejected onto the media.

One-dimensional (1D) color calibration, or linearization, refers to such adjustment by adjusting the colorant for each color component of the color space independently, without respect to its interaction with the colorants of the other color components of the color space. A color calibration, or linearization, table is thus a look-up table that changes an input value to a unique output value. For instance, for a heavier inkjet pen, having a larger ink drop weight, the output gray level may be smaller than the input gray level after 1D color calibration. Alternatively, for a lighter inkjet pen, having a smaller ink drop weight, the output gray level may be larger than the input gray level after 1D color calibration. It is noted that the phrases color calibration and linearization are utilized synonymously herein.

In one embodiment 1D linearization that takes into account bi-directional printing is accomplished as follows. The amount of gray level that is needed to achieve an intended measurement quantity, such as optical density, intensity, lightness, and so on, for a given input tone is determined, based on the measurement data obtained from both directions. For instance, for a given gray level, the measurement data when the colorant-ejection mechanism is traveling from left to right may e measured as A. Similarly, for the same given gray level, the measurement data when the colorant-ejection mechanism is traveling from right to left may be measure as B. In this embodiment, regardless of whether the colorant-ejection mechanism is traveling from left to right or from right to left, the intended measurement value is equal to the average of A and B for the given input tone. The linearization table generated from this combined measurement is then used for both directions.

In another embodiment more precise 1D linearization that takes into account bi-directional printing is accomplished, by having two 1D linearization tables for the colorant in question, one for each direction. The measurement obtained when the colorant-ejection mechanism is traveling from left to right is used to generate the first 1D linearization for a color component. The measurement obtained when the colorant-ejection mechanism is traveling from right to left is used to generate the second linearization table for the same color component. This embodiment of the invention achieves more accurate results in color calibration as compared to the embodiment of the invention that utilizes one linearization table.

The 1D color calibration, or linearization, performed by embodiments of the invention is preferably performed in an online manner, yielding what are referred to as online color calibration, or linearization, tables. Online color calibration is color calibration that is performed under actual or current printing conditions in which colorant ejection, such as ink output, is performed. This is in comparison to offline color calibration, which is color calibration that is not performed under actual, run-time conditions. For instance, whereas offline color calibration may be accomplished for a given type of image-forming device by the manufacturer, online color calibration may be accomplished for one such specific device by the end user. Offline color calibration tables may thus be pre-built into the device, whereas online color calibration tables are generated after the image-forming device has been manufactured. Performing 1D color calibration in an online manner for bi-directional printing maintains the accuracy of the bi-directional color maps, and corrects hue shift. It improves the robustness of bi-directional printing print quality.

Constructing Online One-Dimensional Linearization Tables

Figure 3:
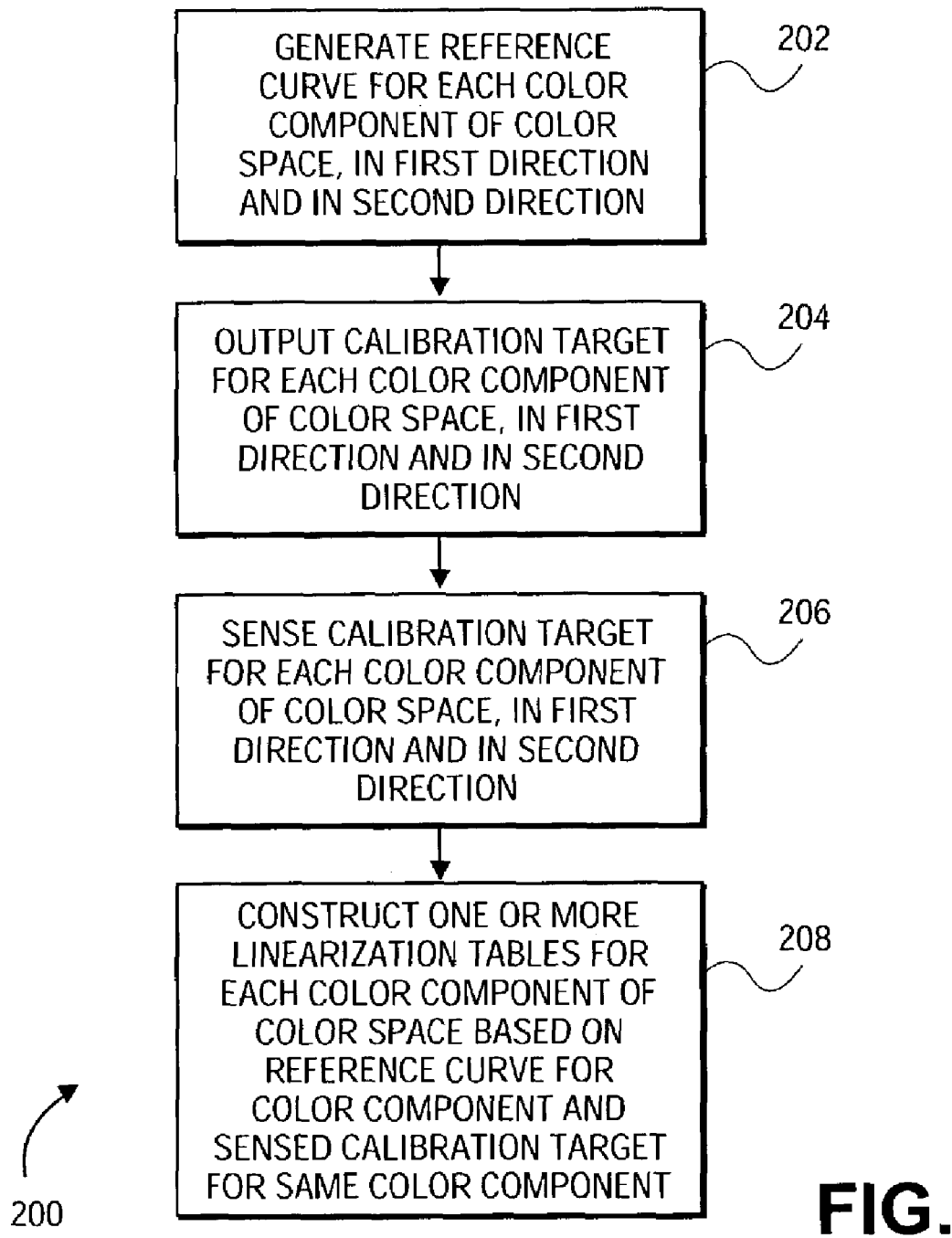
FIG. 3 is a flowchart of a method to construct a linearization table for each color component of a color space, according to an embodiment of the invention.

FIG. 3 shows a method 200 for constructing one-dimensional (1D) linearization tables in an online manner, according to an embodiment of the invention. The linearization tables are constructed in an online manner in that they are preferably constructed to reflect current, or actual, printing conditions, as opposed to offline conditions. Such linearization, or color calibration, tables are referred to herein as online linearization tables. A reference curve is generated for each color component of a color space, in both a first direction and a second direction (202). The color space may be the cyan-magenta-yellow-black (CMYK) color space, having the color components cyan, magenta, yellow and black. The first direction may be, for instance, where a colorant-ejection mechanism travels from left to right over a media swath, whereas the second direction may be where the colorant-ejection mechanism travels from right to left over tho media swath.

The reference curves indicate the desired amounts of colorant to be output onto the media to achieve the desired measurement goal, such as the desired intensity, density, lightness, and so on, for each colorant in each direction. Where there are four color components and two directions, there are four times two, or eight, reference curves. Each curve may provide the amount of colorant to be output onto the media to attain the desired measurement values of a given color component. For example, for a color space in which each color component has a color space of eight bits in depth, there are $2^8=256$ different gray values for each color component, from a lowest value of $2^0-1=0$ to a highest value of $2^8-1=255$. Typically, the lowest value corresponds to the lightest tone, or shade, gray level, and so on, of the color component, whereas the heights value corresponds to the darkest tone of the color component.

The reference curves preferably reflect the amounts of colorant that are to be output to achieve the desired measurement values of the color components under nominal conditions. Hence, the reference curves are used along with measurement curves to create a new set of linearization tables, which in turn accurately reflect the correct amounts of colorant to be output to achieve the targeted measurement values of the color components in an instance of actual conditions. The reference curves may be obtained by retrieving them from memory of an image-forming device, where they were previously constructed and stored in the memory of the image-forming device. Alternatively, they may be constructed during actual performance of the method 200 of FIG. 3.

Figure 4A:
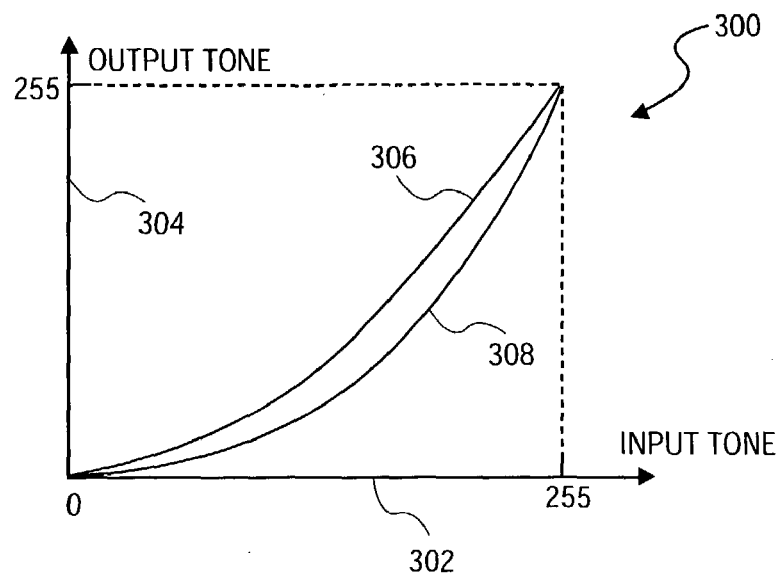
FIG. 4A is a graph depicting a simplified example of two linearization curves for bi-directional printing, according to an embodiment of the invention.

FIG. 4A shows a graph 300 depicting a simplified example of one pass bi-directional color calibration curves 306 and 308, or tables, according to an embodiment of the invention. The x-axis 302 indicates the input gray value, whereas the y-axis 304 indicates the output gray value for the color component in question to be output onto the media to achieve the target measurement value. The curves 306 and 308 may each represent the color calibration results on a different direction for the same color component. For example, the curve 306 may correspond to the direction when the colorant-ejection mechanism is traveling from left to right over a media swath, whereas the curve 308 may correspond to the direction when the mechanism is traveling from right to left. For a given input gray value on the x-axis 302, the curve 306 dictates a larger output gray value than the curve 308 does. Thus, when the colorant-ejection mechanism is traveling from left to right, it outputs a larger amount of colorant, such as ink, to achieve a given target value. Conversely, for the same given input gray value, the colorant-ejection mechanism when traveling from right to left ejects a smaller amount of colorant, such as ink, to achieve the same intended target value.

Referring back to FIG. 3, the method 200 next outputs a calibration target for each color component of the color space, in both the first direction and the second direction (204). For each color component, a calibration target corresponding to a series of steps ranging from 0–255 of a single color component is output, or printed, in the first direction, and also in the second direction. The color calibration target ideally may be designed at 256 patches, in which each patch represents the unique gray level from 0–255 for a single colorant. In real-time, however, the color calibration target includes down-sampled color patches to cover the total tone range of 0–255, because of time and storage consideration. For instance, the color calibration target may be designed as seventeen color patches with increments of sixteen gray values for each color component. The color calibration target is printed for each color component in each direction.

Figure 4B:
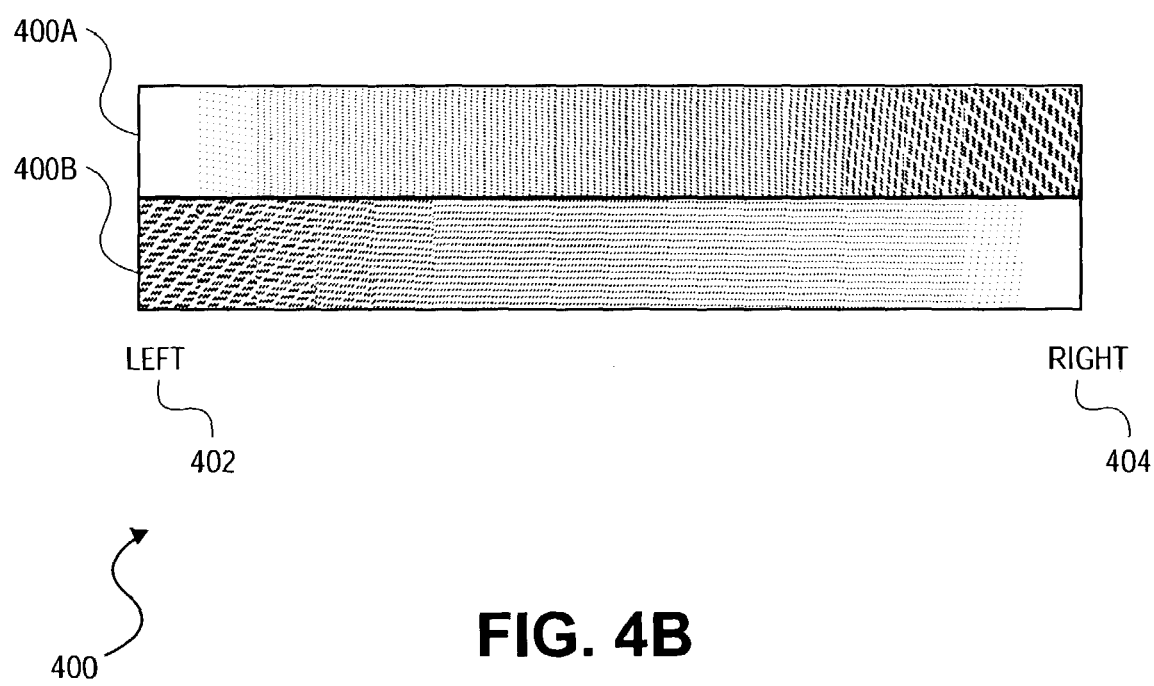
FIG. 4B is a diagram of a simplified example of bi-directional color calibration targets for a color component of a color space, according to an embodiment of the invention.

FIG. 4B shows a simplified example of bi-directional color calibration target 400 for a color component in two directions, according to an embodiment of the invention. The calibration targets 400 include the calibration target 400A and the calibration target 400B. The target 400A includes seventeen patches with an equal increment of sixteen gray level from a lightest shade, which is gray level 0, to a darkest shade, which is gray level 255, while the colorant-ejection mechanism travels from the left 402 to the right 404. By comparison, the target 400B includes seventeen patches with sixteen gray levels from the lightest shade, which is again gray level 0, to the darkest shade, which is again gray level 255, while the mechanism travels from the right 404 to the left 402. The targets 400 may be designed as any number of patches with either equal or non-equal increments in between. Furthermore, the target orientation and arrangement may differ from that depicted in FIG. 4B, so long as they can be appropriately used to achieve bi-directional color calibration.

Referring back to FIG. 3, the method 200 next senses the calibration target for each color component of the color space in each direction (206). For each gray value output for each color component in each direction, the calibration target is measured to obtain the raw sensing data. The measurement may be measured to obtain the raw sensing data. The measurement may be accomplished by using an optical sensor, another type of sensor, or any other sensing device, and correlating the measured data with the gray value in the target. The raw sensing output reflects actual printing conditions, such as actual current environmental conditions, actual current colorant, such as ink, types and drop weights, and so on. The raw sensing data obtained from the sensing device is converted mathematically into measurable quantities, such as lightness, optical density, intensity, and so on. The measurement data is hen used, in conjunction with the reference curve, to generate the color calibration table for he color component in each direction.

Therefore, one or more online linearization tables are constructed for each color component of the color space, based on the reference curve for the color component and the calibration target of the color component as sensed (208). Each linearization table is a 1D linearization table that, for a given gray value of a color component, provides the corresponding output gray value to achieve the intend value in the reference curve. There is at least one linearization table for each color component, which is used regardless of whether the colorant-ejection mechanism is traveling from left to right or from right to left. In another embodiment, there are two linearization tables for each color component, one for when the mechanism travels from left to right, and one for when the mechanism travels from right to left.

Figure 5:
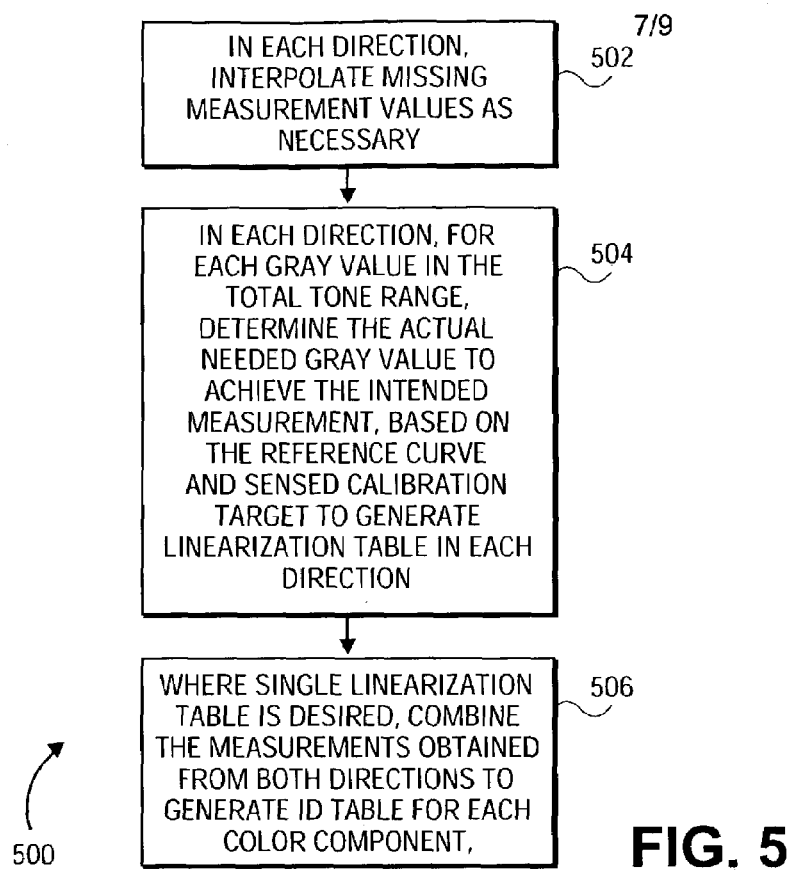
FIG. 5 is a flowchart of a method illustrating one part of the method of FIG. 3 in more detail, according to an embodiment of the invention.

FIG. 5 shows a method 500 to construct the linearization table(s) for a color component, according to an embodiment of the invention. The method 500 may thus be performed in 208 of the method 200 of FIG. 3 for each color component of the color space. First, any missing measurement data for the gray values not represented by the color calibration target are interpolated, in each direction (502). Next, in each direction, for each input gray value the actual gray value to achieve the targeted measurement curve that was obtained in the calibration target in each direction is linearized to the reference curve in each direction. The phrase "sensed calibration target data" as used herein is inclusive of any values that were interpolated from sensed values, and not directly sensed themselves. A 1D linearization table is the color calibration that results for the color component in each direction.

Performing the method 500 though 504 yields a linearization table for the color component in question in each direction. That is, two linearization tables are constructed for the color component, one for the first direction, and one for the second direction. However, in situations in which one linearization table is desired for the color component, encompassing both directions, the measurement is the combination of the two measurement for both directions (506). The combination may simply be achieved by averaging, or by another approach.

Method of Use and Image-Forming Device

Figure 6:
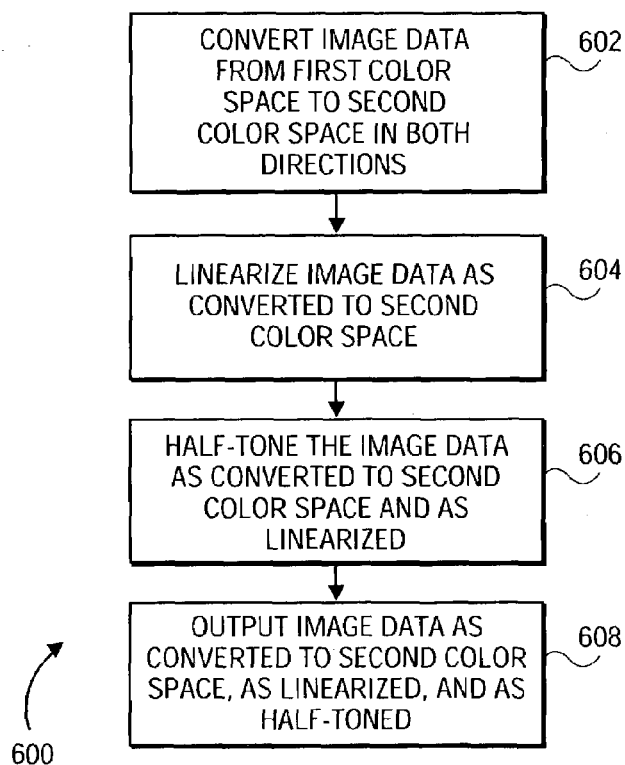
FIG. 6 is a flowchart of a method of use, according to an embodiment of the invention.

FIG. 6 shows a method of use 600, according to an embodiment of the invention. The method 600 is performed relative to image data representing an image to be output onto media. The method 600 may be completely performed by an image-forming device, such as an inkjet printer, or it may be partially performed by an image-forming device, and partially performed by a host device to which the image-forming device is communicatively connected. The host device may be a computer, for instance, such as a desktop computer, a laptop computer, and so on. The method 600 may be implemented as a number of computer-executable instructions, organized as programs, libraries, subroutines, objects, and so on. The method 600 may be implemented as a number of computer-executable instructions, organized as programs, libraries, subroutines, objects, and so on, stored on a computer-readable medium, such as a volatile or non-volatile medium, a fixed or removable medium, and/or a magnetic, optical, and/or solid-state medium.

The image data is converted from a first color space to a second color space, both according to a first direction and according to a second direction (602). For example, the image data may originally be formatted in accordance with a red-green-blue (RGB) color space. Each pixel of the image data may have three gray values, one for each of the red, green, and blue color components of the RGB color space. The image data may be converted to a cyan-magenta-yellow-black (CMYK) color space, in each direction. For example, the image data may be converted from the RGB color space to the CMYK color space in a first direction, and from the RGB color space to the CMYK color space in a second direction, which may be referred to as the C'M'Y'K' color space. The first direction may correspond to a colorant-ejection mechanism of the image-forming device moving from left to right over a media swath, whereas the second direction may correspond to the colorant-ejection mechanism moving from right to left over the media swath. The two color maps corresponding to different printing directions is called a bi-directional color map.

Figure 7:
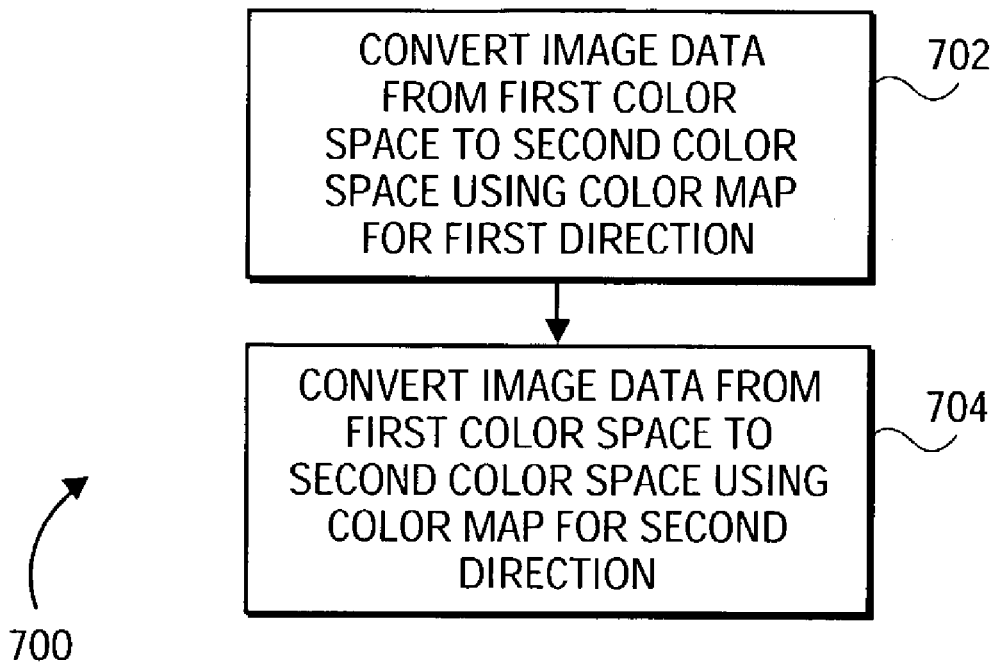
FIG. 7 is a flowchart of a method for converting image data from a first color space to a second color space, in each of two directions, according to an embodiment of the invention.

FIG. 7 shows a method 700 for converting the image data from a first color space to a second color space, according to an embodiment of the invention. The method 700 may be performed to accomplish 602 of the method 600 of FIG. 6. The image data is converted from the first color space to the second color space using a color map for the first direction (702), and the image data is also converted from the first color space to the second color space using a color map for the second direction (704). Where the first color space is the RGB color space and the second color space is the CMYK color space, each color map may map each unique gray value triplet (R, G, B) to a corresponding gray value quadruplet (C, M, Y, K). If each color space is eight bits in depth, each of the values R, G, B, C, M, Y, and K has a value from 0 to 255. Thus, each pixel n having the gray value triplet $(R_n, G_n, B_n)$ is mapped to two gray value quadruplets $(C_n, M_n, Y_n, K_n)$ and $(C'_n, M'_n, Y'_n, K'_n)$, where the former quadruplet is used to output the pixel n in the first direction and the latter quadruplet is used to output the pixel n in the second direction.

Referring back to FIG. 6, the image data as has been converted to the second color space is linearized (604). That is, bi-directional color calibration utilizing one or more online color calibration, or linearization, tables is accomplished. Linearization is performed so that the gray value quadruplets of each pixel of the image data accurately reflect the actual printhead conditions in which colorant ejection, and hence image formation, is being accomplished. In one embodiment, linearization is accomplished using a single online linearization table for each color component of the second color space in both directions, as may have been constructed as described in the preceding section of the detailed description.

Figure 8:
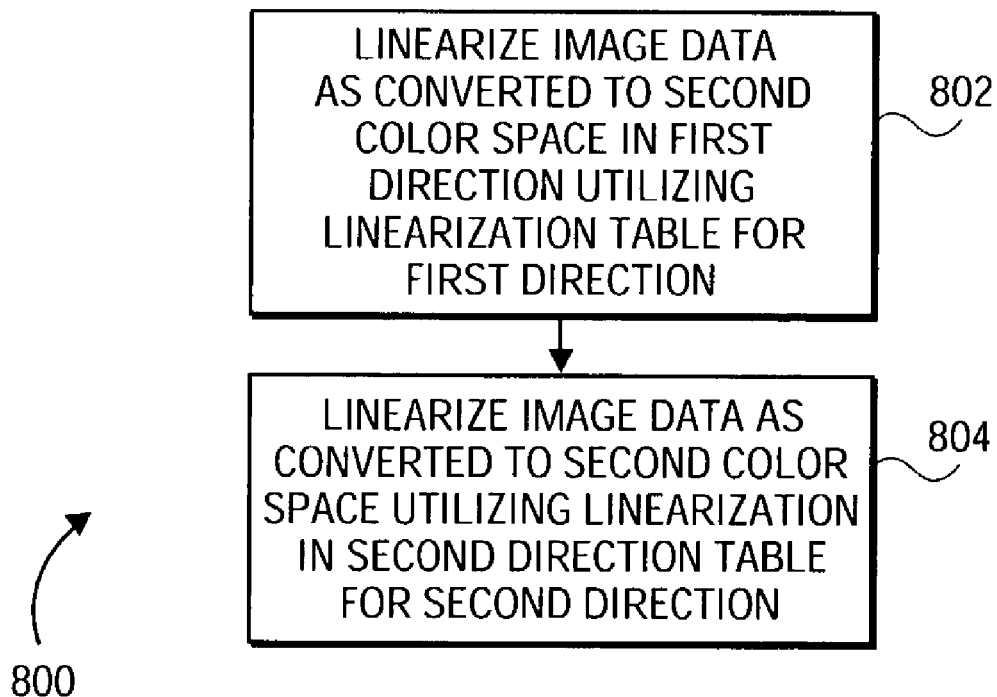
FIG. 8 is a flowchart of a method to linearize image data utilizing a linearization table for each of two directions, according to an embodiment of the invention.

FIG. 8 shows a method 800 for linearizing the image data as has been converted to the second color space using two linearization tables for each color component in each direction, according to an embodiment of the invention. The method 800 may be performed to accomplish 604 of the method 600 of FIG. 6. The image data as converted to the second color space in the first direction is color calibrated utilizing an online linearization table for each color component in the first direction (802), and the image data as converted to the second color space in the second direction is color calibrated utilizing an online linearization table for each color component in the second direction (804). That is, two linearization tables for each color component are used in the embodiment of FIG. 8, one for each direction.

Referring back to FIG. 6, the image data as has been converted to the second color space in both directions and as has been linearized is then preferably half-toned (606). Half-toning is generally described as a process for transforming the continuous tone image, such as having values rom 0-255 for an eight-bit image, to a binary image, having values of either 0 or 1, which is also referred to as a half-tone image. The half-tone image is rendered in such a manner that preferably it preserves all visual information of the continuous one image, and minimizes the granularity artifacts due to linearization. Half-toning may be accomplished as known within the art.

Finally, the image data as has been converted in the second color space from the first color space in both directions, as has been linearized, and preferably as has been half-toned, is output (608). For instance, the colorant-ejection mechanism of the image-forming device, such as an inkjet printhead of an inkjet printer, may be utilized to output the image data, resulting in the formation of the image represented by the ink or colorant droplets onto the media. Depending on which direction the colorant-ejection mechanism is traveling when outputting colorant, such as ink, over a given swath of media, the image data as has been converted, linearized, and preferably half-toned for the first direction is utilized, or the image data as has been converted, linearized and half-toned for the second direction is utilized.

Figure 9:
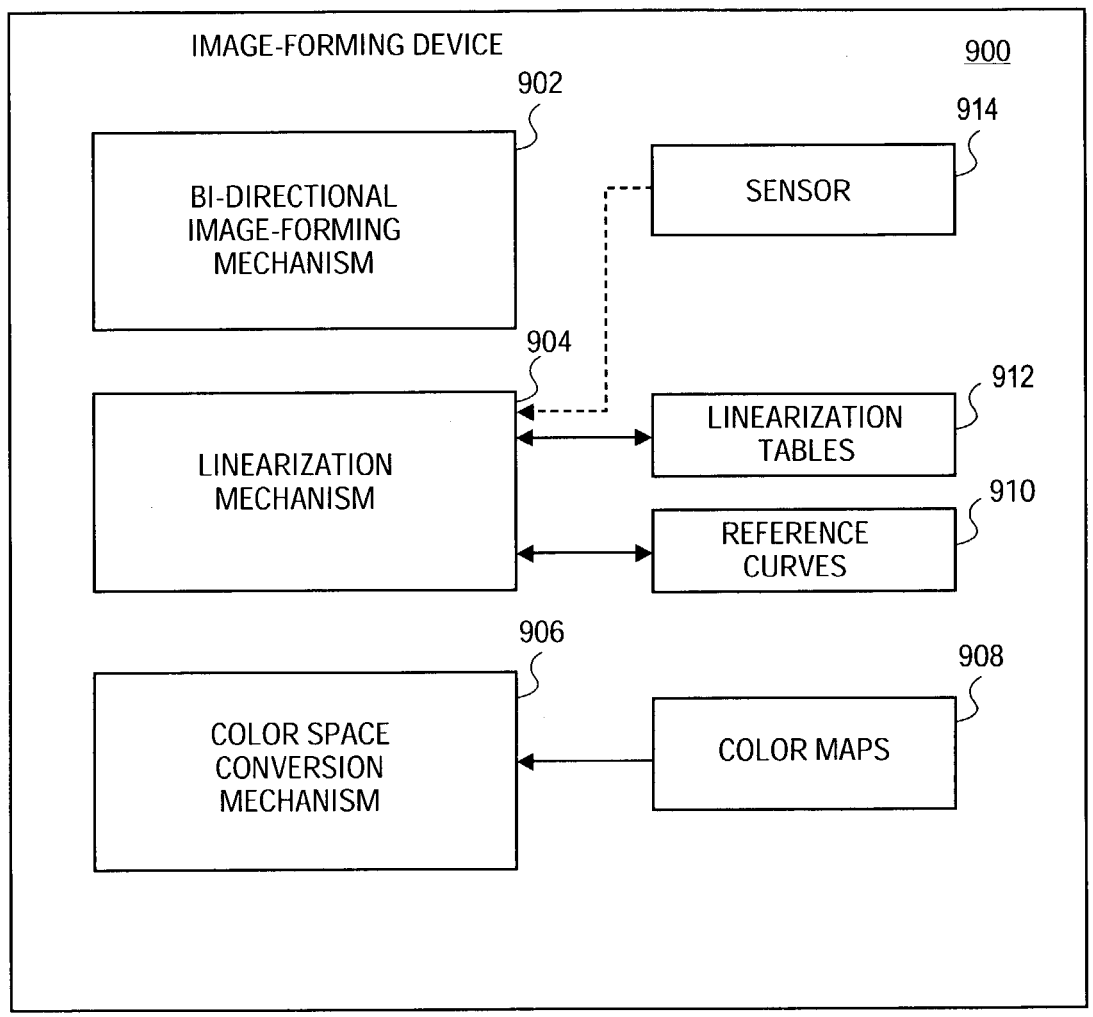
FIG. 9 is a block diagram of an image-forming device, according to an embodiment of the invention.

FIG. 9 shows a block diagram of an example image-forming device 900, according to an embodiment of the invention. As can be appreciated by those of ordinary skill within the art, the image-forming device 900 can include other components in addition to or in lieu of the components depicted in FIG. 9, and those components depicted in FIG. 9 are intended to depict implementation of a particular embodiment of the invention. Furthermore, not all of the components depicted in FIG. 9 need to be present in an image-forming device 900 in a given embodiment of the invention. As shown in FIG. 9, the image-forming device 900 includes a bi-directional image-forming mechanism 902, a linearization mechanism 904, a color space conversion mechanism 906, a memory 908 storing bi-directional color maps for the mechanism 906, a memory 912 storing linearization tables for the mechanism 904, a memory 910 storing reference curves for the mechanism 904, and a sensor 914.

The bi-directional image-forming mechanism 902 is that which actually outputs colorants onto media. The mechanism 902 is bi-directional in that it can move over the media in two directions, each as left to right and right to left. The colorants may be colorant in the case where the mechanism 902 is a colorant-ejection mechanism. More specifically, the colorants may be ink in the case where the mechanism 902 is an ink-ejection mechanism.

The linearization mechanism 904 linearizes the image data as has already been converted to or formatted for the color space of the bi-directional image-forming mechanism 902 according to each of two directions. The linearization mechanism 904 performs the linearization utilizing one or more linearization tables, as stored in the memory 912, that reflect current, or actual, conditions in which the mechanism 902 is operating. The linearization mechanism 904 may also as needed generate the one or more linearization tables, as has been described, and stores them in the memory 912. The memory 910, the memory 912, and the sensing device 914 may all be part of the linearization mechanism 604. The linearization mechanism 904 may be software, hardware, or a combination of software and hardware.

The color space conversion mechanism 906 converts the image data from another color space, such as the RGB color space, to the color space of the bi-directional image-forming mechanism 902 according to each of two directions. The color space conversion mechanism 906 performs its conversion utilizing a first directional nominal color map and a second directional nominal color map as stored in the memory 908, which is labeled color maps in FIG. 9. The memory 908 may be a part of he mechanism 906. Like the mechanism 904, the mechanism 906 may be software, hardware, or a combination of software and hardware. The mechanism 906 and the mechanism 904 may also be parts of a single such mechanism.

The sensor 914 is use by the linearization mechanism 904 when the linearization mechanism 904 generates the one or more online linearization tables for each of the color components of the color space of the bi-directional image-forming mechanism 902. For instance, as has been described, after calibration targets have been output onto media, the sensor 914 is used to sense for the densities, lightness or intensities, of the printed calibration target. The measurements determined by the sensor 914 are correlated with gray value. The sensor 914 may be an optical sensor, or another type of sensor.

CONCLUSION

It is noted that, although specific embodiments have been illustrated and described herein, it will be appreciated by those of ordinary skill in the art that any arrangement that is calculated to achieve the same purpose may be substituted to the specific embodiments shown. Other applications and uses of embodiments of the invention, besides those described herein, are amenable to at least some embodiments. This application is intended to cover any adaptations of variations of embodiments of the present invention. Therefore, it is manifestly intended that embodiments of this invention be limited only by the claims and equivalents thereof.

We claim:

1. A method comprising:
   generating a reference curve for each of a plurality of color components of a color space for each of a first direction and a second direction;
   outputting a calibration target for each of the plurality of color components of the color space for each of the first direction and the second direction;
   sensing the calibration target for each of the plurality of color components of the color space for each of the first direction and the second direction; and,
   constructing one or more online color calibration tables for each of the plurality of color components of the color space based on the reference curve for the color component and the calibration target for the color component as sensed.

2. The method of claim 1, wherein generating the reference curve for each of the plurality of color components of the color space for each of the first direction and the second direction comprises generating the reference curve as reflecting nominal conditions for each of the plurality of color components for each of the first direction and the second direction.

3. The method of claim 1, wherein generating the reference curve for each of the plurality of color components of the color space for each of the first direction and the second direction comprises retrieving the reference curve for each of the plurality of color components of the color space for each of the first direction and the second direction as previously stored in an image-forming device.

4. The method of claim 1, wherein outputting the calibration target for each of the plurality of color components of the color space for each of the first direction and the second direction comprises outputting shades of each of the plurality of color components in each of the first direction and the second direction from a lightest shade to a darkest shade in discrete intervals.

5. The method of claim 4, wherein sensing the calibration target for each of the plurality of color components of the color space for each of the first direction and the second direction comprises measuring each shade of each of the plurality of color components in each of the first direction and the second direction.

6. The method of claim 1, wherein constructing the one or more online color calibration tables for each of the plurality of color components of the color space based on the reference curve for the color component and the calibration target for the color component as sensed comprises:
   generating a first online color calibration table for each of the plurality of color components of the color space based on the reference curve for the color component in the first direction and the calibration target for the color component in the first direction as sensed; and,
   generating a second online color calibration table for each of the plurality of color components of the color space based on the reference curve for the color component in the second direction and the calibration target for the color component in the second direction as sensed.

7. The method of claim 1, wherein constructing the one or more online color calibration tables for each of the plurality of color components of the color space based on the reference curve for the color component and the calibration target for the color component as sensed comprises generating an online color calibration table for each of the plurality of color components of the color space based on the reference curves for the color component in the first and the second directions and the calibration targets, as sensed, for the color component in the first and the second directions.

8. An image-forming device comprising:
   a bi-directional image-forming mechanism having colorants corresponding to colors of a color space to output shades of each colorant from a lightest shade to a darkest shade onto media in each direction;
   a memory storing a reference curve and one or more color calibration tables for each color of the color space in each direction;
   a sensor to sense as sensing data the shades of each colorant output onto the media in each direction; and,
   a color calibration mechanism to generate the one or more color calibration tables for each of the colorants by color calibrating the gray values of the shades of each colorant output onto the media in each direction based on the reference curve of the colorant and the sensing data in each direction.

9. The image-forming device of claim 8, wherein the bi-directional image-forming mechanism is an inkjet-printing mechanism having inks corresponding to the colors of the color space.

10. The image-forming device of claim 8, wherein the memory is part of a conversion mechanism of the image-forming device to convert image data from another color space to the color space having the colors to which the colorants of the bi-directional image-forming mechanism correspond.

11. The image-forming device of claim 8, wherein the one or more color calibration tables for each of the colorants comprises one color calibration table for each of the colorants encompassing both directions.

12. The image-forming device of claim 8, wherein the one or more color calibration tables for each of the colorants comprises a color calibration table for each of the colorants in each direction.

* * * * *

UNITED STATES PATENT AND TRADEMARK OFFICE
CERTIFICATE OF CORRECTION

| | | |
|---|---|---|
| PATENT NO. | : 7,133,159 B2 | Page 1 of 4 |
| APPLICATION NO. | : 10/408199 | |
| DATED | : November 7, 2006 | |
| INVENTOR(S) | : Dongli Yang et al. | |

It is certified that error appears in the above-identified patent and that said Letters Patent is hereby corrected as shown below:

On the face page, in field (57), under "Abstract", in column 1, line 1, delete "he" and insert -- the --, therefor.

In column 1, line 10, after "moving" delete "rom" and insert -- from --, therefor.

In column 1, line 17, after "factor" delete "or" and insert -- of --, therefor.

In column 1, line 43, after "translates" insert -- R --.

In column 3, line 12, after "from" delete "the".

In column 3, line 24, after "color" insert -- depth --.

In column 3, line 43, after "from" delete "the".

In column 3, line 51, delete "$C_eM_eY_eK_3$" and insert -- $C_eM_eY_eK_e$ --, therefor.

In column 3, line 52, delete "$C_oM_oY_oK_9$" and insert -- $C_oM_oY_oK_o$ --, therefor.

In column 4, line 15, after "by" delete "a" and insert -- an --, therefor.

In column 4, line 24, delete "250" and insert -- 150 --, therefor.

In column 5, line 11, after "170" insert -- is --.

In column 5, line 59, after "may" delete "e" and insert -- be --, therefor.

UNITED STATES PATENT AND TRADEMARK OFFICE
CERTIFICATE OF CORRECTION

| | | |
|---|---|---|
| PATENT NO. | : 7,133,159 B2 | |
| APPLICATION NO. | : 10/408199 | |
| DATED | : November 7, 2006 | |
| INVENTOR(S) | : Dongli Yang et al. | |

It is certified that error appears in the above-identified patent and that said Letters Patent is hereby corrected as shown below:

In column 6, line 53, after "over" delete "tho" and insert -- the --, therefor.

In column 7, line 1, after "the" delete "heights" and insert -- highest --, therefor.

In column 7, line 46, after "designed" delete "at" and insert -- as --, therefor.

In column 8, lines 13-15, after "data." delete "The measurement may be measured to obtain the raw sensing data."

In column 8, line 24, delete "hen" and insert -- then --, therefor.

In column 8, line 26, delete "he" and insert -- the --, therefor.

In column 8, line 31, after "target" delete "of" and insert -- for --, therefor.

In column 8, line 36, after "color" insert -- component. In one embodiment, there is one linearization table for each color --.

In column 8, line 50, after "measurement" insert -- value is determined, based on the reference curve for the direction and the sensed calibration data for the direction (504). That is, the measurement --.

In column 8, line 58, after "500" delete "though" and insert -- through --, therefor.

UNITED STATES PATENT AND TRADEMARK OFFICE
CERTIFICATE OF CORRECTION

| | | |
|---|---|---|
| PATENT NO. | : 7,133,159 B2 | |
| APPLICATION NO. | : 10/408199 | |
| DATED | : November 7, 2006 | |
| INVENTOR(S) | : Dongli Yang et al. | |

It is certified that error appears in the above-identified patent and that said Letters Patent is hereby corrected as shown below:

In column 9, lines 11-14, delete "The method 600 may be implemented as a number of computer-executable instructions, organized as programs, libraries, subroutines, objects, and so on.".

In column 10, line 23, delete "rom" and insert -- from --, therefor.

In column 10, line 27, delete "one" and insert -- tone --, therefor.

In column 10, line 28, delete "linearization" and insert -- binarization --, therefor.

In column 10, line 30, delete "in" and insert -- to --, therefor.

In column 10, line 63, delete "each" and insert -- such --, therefor.

In column 10, line 63, after "left." insert -- The colorants output by the mechanism 902 correspond to the color components of the color space, such as the CMYK color space, to which the image data has been converted for two directions, linearized, and preferably half-toned. --.

In column 11, line 5, delete "the" and insert -- its --, therefor.

In column 11, line 11, after "mechanism" delete "604" and insert -- 904 --, therefor.

UNITED STATES PATENT AND TRADEMARK OFFICE
CERTIFICATE OF CORRECTION

PATENT NO. : 7,133,159 B2
APPLICATION NO. : 10/408199
DATED : November 7, 2006
INVENTOR(S) : Dongli Yang et al.

It is certified that error appears in the above-identified patent and that said Letters Patent is hereby corrected as shown below:

In column 11, line 22, after "part of" delete "he" and insert -- the --, therefor.

In column 11, line 43, after "substituted" delete "to" and insert -- for --, therefor.

In column 11, line 48, before "variations" delete "of" and insert -- or --, therefor.

Signed and Sealed this

Twenty-third Day of December, 2008

JON W. DUDAS
*Director of the United States Patent and Trademark Office*